United States Patent [19]

Yawn

[11] Patent Number: 5,202,135
[45] Date of Patent: Apr. 13, 1993

[54] BOTTLE FLASH TRIMMING APPARATUS
[75] Inventor: John E. Yawn, Memphis, Tenn.
[73] Assignee: Ring Can Corporation, Oakland, Tex.
[21] Appl. No.: 682,231
[22] Filed: Apr. 9, 1991
[51] Int. Cl.⁵ .............................................. B29C 49/72
[52] U.S. Cl. ................................... 425/527; 264/161; 425/301; 425/806
[58] Field of Search ............... 83/914; 264/161; 425/301, 527, 553, 806

[56] References Cited

U.S. PATENT DOCUMENTS

| | | | |
|---|---|---|---|
| 2,994,103 | 8/1961 | Schaich | 425/806 |
| 3,172,152 | 3/1965 | Uhlig | 425/806 |
| 3,464,084 | 9/1969 | Thompson | 425/527 |
| 3,771,394 | 11/1973 | Harris et al. | 83/914 |
| 3,892,513 | 7/1975 | Mehnert et al. | 425/806 |
| 3,901,637 | 8/1975 | Eggert | 425/806 |
| 3,994,651 | 11/1976 | Kamibayashi | 425/301 |
| 4,361,531 | 11/1982 | Black | 264/161 |
| 4,421,472 | 12/1983 | Martin, Jr. | 425/527 |
| 4,944,667 | 7/1990 | Greene | 425/806 |
| 4,982,635 | 1/1991 | Thatcher | 83/914 |

Primary Examiner—Jay H. Woo
Assistant Examiner—Scott Bushey
Attorney, Agent, or Firm—Nies, Kurz, Bergert & Tamburro

[57] ABSTRACT

Trimming apparatus for trimming the top flash, neck flash, handle opening flash, and bottom flash from a blow molded plastic bottle. The handle opening flash is removed by a punch and anvil to act against the handle opening flash and push it laterally away from the handle for separation from the bottle. The top and neck flash, and the bottom flash, are each removed by respective gripper devices that grip respective portions of the flash and pull the flash linearly away from the bottle to effect separation of the flash from the bottle. The handle opening flash removing device remains in position within the handle opening to thereby serve to hold the bottle against vertical upward movement as the top and bottom flash are being removed. Upper and lower grippers having a pair of gripper jaws are provided to pull the flash in an axial direction from the top and bottom of a bottle, and to avoid the need for precise positioning of the bottle relative to a flash cutter.

20 Claims, 5 Drawing Sheets

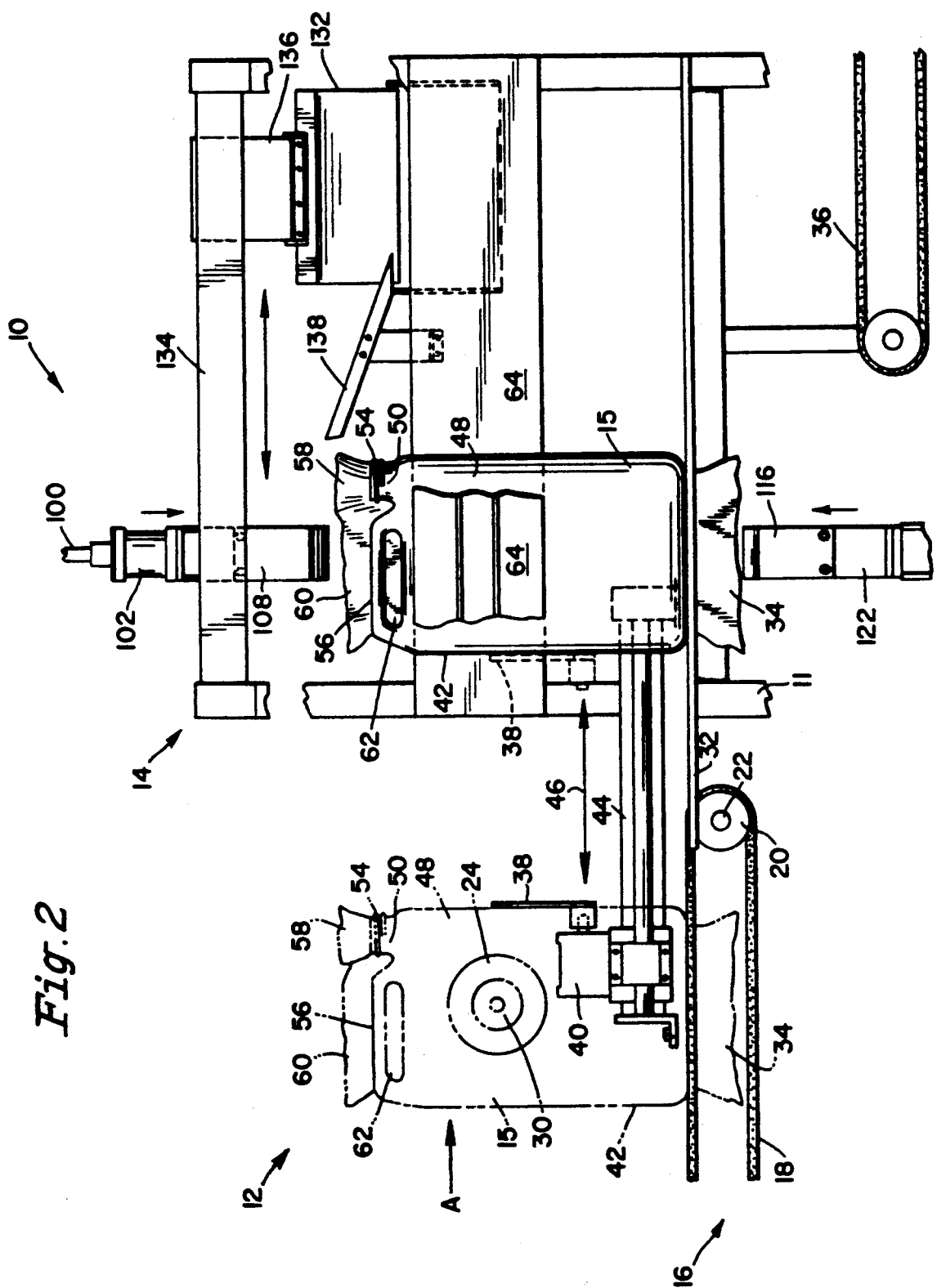

BOTTLE FLASH TRIMMING APPARATUS

BACKGROUND OF THE INVENTION

1. Field of the Invention

The present invention relates to apparatus for trimming the molding flash that exists at the bottle neck and top, at the bottle base, and at the bottle handle from blow molded plastics bottles having an integral handle. More particularly, the present invention relates to a bottle trimming apparatus in which the flash is trimmed from a blow molded plastics bottle after the bottle has left the blow mold, and in which the flash removal is effected by gripping the bottle at the bottle handle, pushing the handle opening flash from the handle opening, and then pulling the neck and base flash material from the bottle.

2. Description of the Related Art

Although plastics bottles can be produced by injection molding, they are most often produced, especially in the larger bottle sizes, by a blow molding operation in which an extruded tubular parison of heated plastics material is placed between the separated parts of a two-part mold that defines a mold cavity to conform with the desired outer shape of the bottle. The mold parts are then brought together so that the parison is enclosed between the mold parts, which clamp the bottom of the parison closed and in which the top of the parison extends through the bottle neck opening defined by the mold parts. Pressurized air is introduced into the parison through the top opening to cause the tubular parison wall within the mold cavity to expand outwardly and to contact the surfaces of the blow mold, to thereby form a bottle having a shape defined by the mold cavity.

In the extrusion blow molding process the tubular parison is open at both ends and has a length that is greater than the axial height of the bottle to be blown. When the mold is enclosed around the parison, so both the upper and the lower ends of the parison extend outwardly from the neck and the base of the bottle mold, and thus an excess of plastic material remains attached to the base and the bottle neck after the blowing operation has been completed and the bottle is removed from the mold. The trimming of such excess material, referred to as "flash," can be removed in various ways, including twisting, shearing, pulling, and tearing.

The prior art has disclosed apparatus that serves to twist off the flash from a molded bottle, either while the bottle is still in the blow mold, or after the bottle has been removed from the mold for subsequent processing. Examples of such disclosures include U.S. Pat. No. 2,994,103, which issued Aug. 1, 1961, to Wilbur A. Schaich; and U.S. Pat. No. 3,994,651, which issued Nov. 30, 1976, to Taketoshi Kamibayashi.

Apparatus for shearing the flash from adjacent the neck of a blow molded bottle and also adjacent the base is disclosed in U.S. Pat. No. 3,795,162, which issued Mar. 5, 1974, to Ben E. Jaeger. The trimming devices involve progressive shearing of the flashing material along the bottle contour to provide a flash-free finished bottle.

Several prior art disclosures of trimming apparatus teach the removal of blow molded bottle flash by pulling the flash from the bottle. Examples of devices that operate in that manner are disclosed in U.S. Pat. No. 3,172,152, which issued Mar. 9, 1965, to A. R. Uhlig; U.S. Pat. No. 4,361,531, which issued Nov. 30, 1982, to Michael Black; and U.S. Pat. No. 3,901,637, which issued Aug. 26, 1975, to Noel B. Eggert.

An approach to the removal of the flash that remains in the opening defined by an integral bottle carrying handle is disclosed in U.S. Pat. No. 3,892,513, which issued Jul. 1, 1975, to Gottfried Mehnert et al. The handle flash or slug is removed while the bottle remains in the blow mold.

The removal of flash by a combination of shearing and pulling is disclosed in U.S. Pat. No. 3,464,084, which issued Sep. 2, 1969, to Robert D. Thompson, in which shear plates are disclosed for severing the flash at the top or neck portion of the bottle, and the bottom flash is removed by holding the flash and pushing the bottle away from the flash holder.

Finally, in U.S. Pat. No. 4,944,667, which issued Jul. 31, 1990, to Thomas F. Greene, apparatus is disclosed involving clamps having open areas to simultaneously grip only the neck flash portion of a series of aligned plastics bottles, the clamps adapted to pivot laterally while the bottles are held to tear the flash from the neck portions of the bottles.

Although a number of different approaches to the problem of removal of flash from blown plastics bottles have bee disclosed, each of the disclosed approaches involves complicated and costly apparatus, and if not properly operated the disclosed apparatus can damage a bottle and render it unacceptable.

It is an object of the present invention to provide bottle flash trimming apparatus that is simpler and more reliable than the prior art devices.

It is another object of the present invention to provide bottle trimming apparatus for trimming the flash from a bottle after the bottle has been removed from the blow mold.

A still further object of the present invention is to provide bottle trimming apparatus that completely removes the flash at the neck, base, and handle opening, and to dispose of it in a controlled fashion.

A still further object of the present invention is to provide bottle trimming apparatus that removes the neck portion flash without distorting the bottle neck or the closure-receiving threads at the neck.

It is still a further object of the present invention to provide bottle trimming apparatus that does not require critical bottle alignment, and that consequently minimizes damaged bottles resulting from improper positioning of the bottle relative to a punch or die structure.

It is still a further object of the present invention to provide bottle trimming apparatus that is able to accommodate bottles having different sizes and styles without the need for complicated additional equipment to adapt the apparatus to accommodate such different sizes and styles.

Additional objects and advantages to be derived from use of the apparatus and method of the present invention will become apparent from the accompanying description and drawings.

SUMMARY OF THE INVENTION

Briefly stated, in accordance with one aspect of the present invention, bottle trimming apparatus is provided for trimming the flash from a blown plastic bottle. The apparatus includes a conveyor for conveying from a blowing station to a trimming station blow molded plastics bottles that include a handle defining a hand-receiving opening, the bottle also including molding flash at both the base and the neck portions thereof. A punch and anvil are provided for punching the plastic flash from the hand-receiving opening defined by the bottle handle, the anvil including a stop bar for engagement with the bottle handle to prevent lateral movement of the bottle as the punch passes through the hand receiving-opening during the punching operation. While the bottle is being held in position by the punch and anvil, bottom flash trimming grippers are brought into position to engage the bottle bottom flash and the bottle top flash for trimming the bottom flash and top flash from the bottle, the flash trimming apparatus including a bottom flash gripper and a top flash gripper, each of which is movable toward and away from the bottle for gripping and pulling the flash from the bottle while the bottle is held against vertical movement by the punch and anvil.

BRIEF DESCRIPTION OF THE DRAWINGS

FIG. 2 is a fragmentary side view of the apparatus shown in FIG. 1.

DESCRIPTION OF THE PREFERRED EMBODIMENTS

Figure 1:
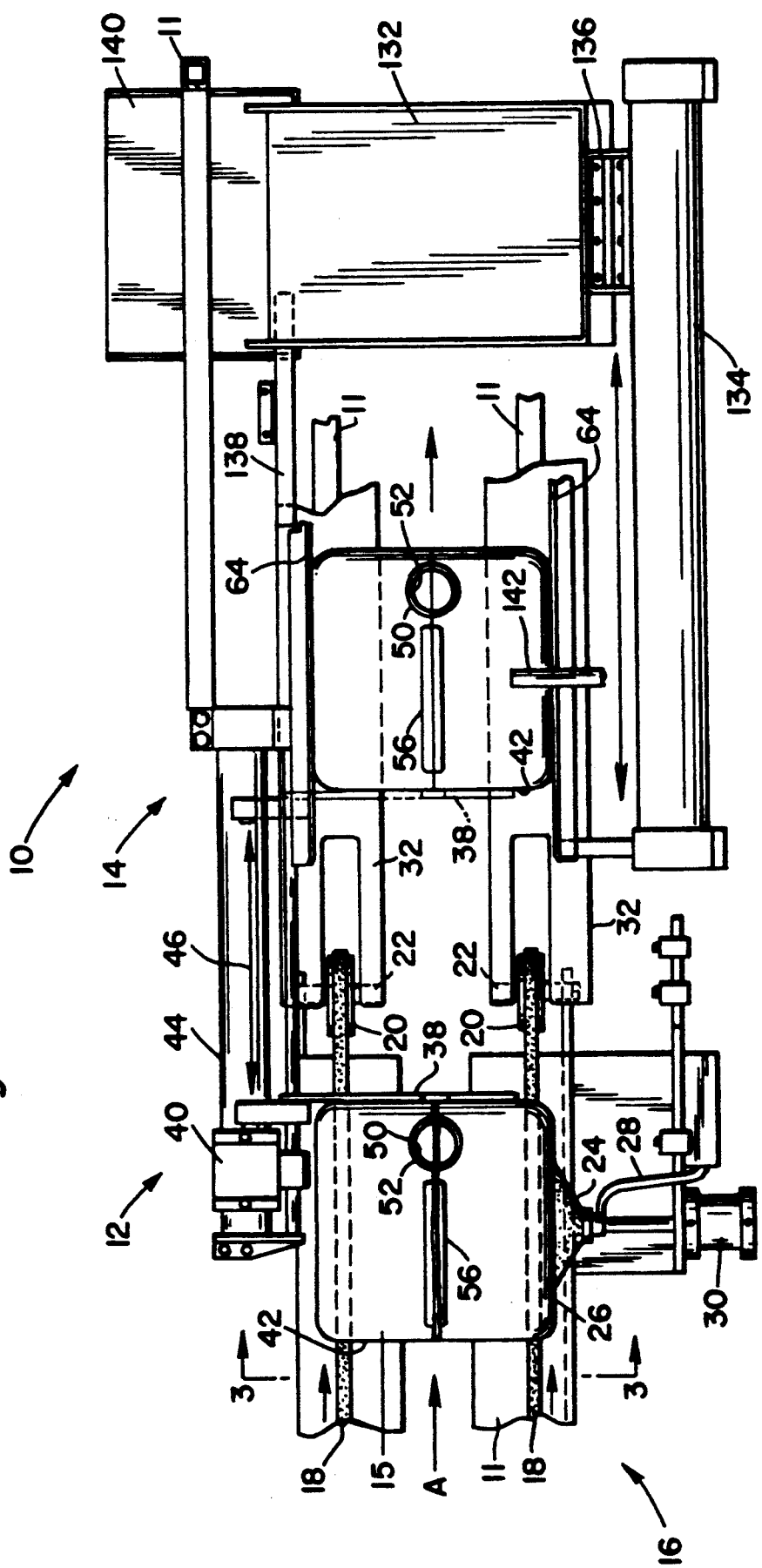
FIG. 1 is a top plan view of a bottle loading station and a bottle trimming station incorporating trimming apparatus in accordance with the present invention.
Figure 6:
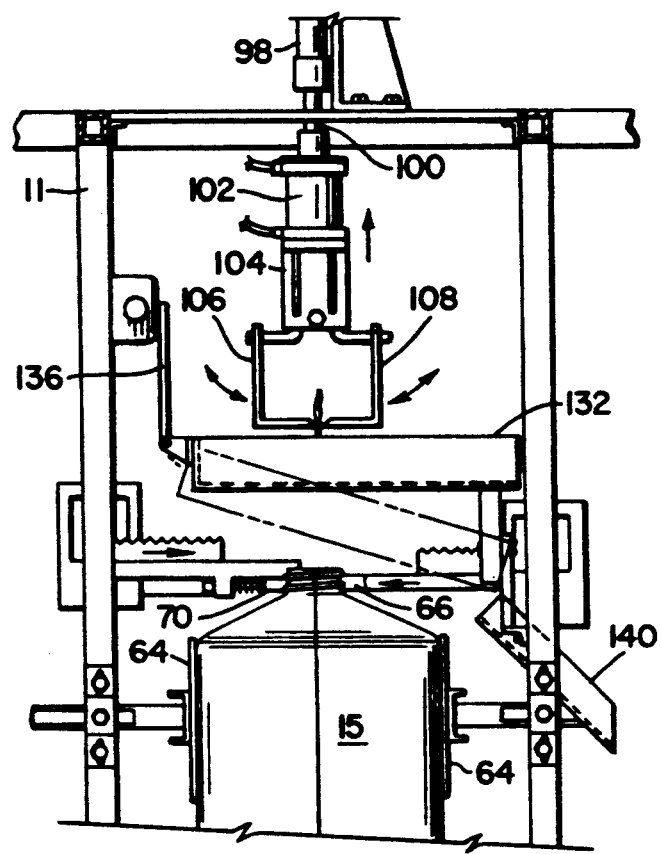
FIG. 6 is a fragmentary end view of a bottle at the trimming station, viewed in the upstream direction, showing a bottle after the neck section flash has been removed.

Referring now to the drawings, and particularly to FIGS. 1 and 2 thereof, there is shown plastics bottle flash removal apparatus 10 in accordance with the present invention. The apparatus includes a frame 11 that supports a loading station 12, and spaced therefrom in a downstream direction a trimming station 14. Plastics bottles 15 from a blow molding machine (not shown) are conveyed to loading station 12, whereupon they are sequentially presented to trimming station 14 for trimming, and are then conveyed away from trimming station 14 for filling with a desired material, or are packaged for shipment to a bottle filler.

A bottle blowing machine (not shown) provides bottles that are conveyed along an infeed conveyor 16 defined by a pair of spaced, parallel V-belts 18 that pass around respective belt pulleys 20 carried on a pulley shaft 22. As shown in FIGS. 1 and 2, only the downstream pulleys and pulley shaft are illustrated, but it is to be understood that a corresponding set of pulleys and a pulley shaft are provided on the upstream side of the apparatus to convey blown bottles in the direction of the arrows in FIGS. 1 and 2.

The incoming bottles from the blow molding machine are presented one-by-one in a continuous sequence and are positioned in aligned, side-to-side relationship on conveyor 16. The first bottle 15 in the sequence is held in position by means of a flexible vacuum cup 24 that engages one side 26 of bottle 15. Vacuum cup 24 has a hollow interior that is connected with a vacuum pump (not shown) through a vacuum conduit 28 to selectively hold or release bottle 15. Vacuum cup 24 is movable in a lateral direction relative to infeed conveyor 16, toward and away from bottle 15, by means of a pneumatic cylinder 30.

Positioned at the outlet of infeed conveyor 16, and at a level just slightly below the plane defined by the tops of parallel V-belts 18, is a trimming station platform 32 for supporting the base of a bottle while the bottle trimming operations are being performed. Platform 32 is in the form of two parallel, coplanar plates that have their uppermost surfaces in a horizontal plane, and that are spaced a distance sufficient that the bottom flash 34 on a bottle that enters trimming station 14 can extend downwardly from the bottle between the plates, while the upper surface of platform 32 provides sufficient area to support the base of the bottle on each side of bottom flash 34. The plates defining platform 32 are supported by frame 11 and extend for a predetermined distance in a downstream direction, whereupon an outflow conveyor (not shown) carries the bottles downstream for further processing. Positioned below platform 32 is a scrap conveyor 36 for collecting and conveying away bottle flash and trim material for subsequent recycling.

The movement of bottles from loading station 12 to trimming station 14 is accomplished by a pusher device that includes a pusher bar 38 carried by a pneumatic rotary actuator 40 so that pusher bar 38 can be pivoted into and out of the path of movement of the bottles about an axis of rotation that is aligned with the direction of bottle movement, designated by arrow A. When pusher bar 38 is in its down position, substantially horizontally disposed, it is in position to engage the side surface 42 of bottle 15 for pushing the bottle from loading station 12 into trimming station 14. The pushing operation is performed by a pneumatic rodless cylinder 44 that carries rotary actuator 40, and with it pusher bar 38, in upstream and downstream directions parallel with the bottle flow direction as indicated by the double headed arrows in FIGS. 1 and 2.

Figure 3:
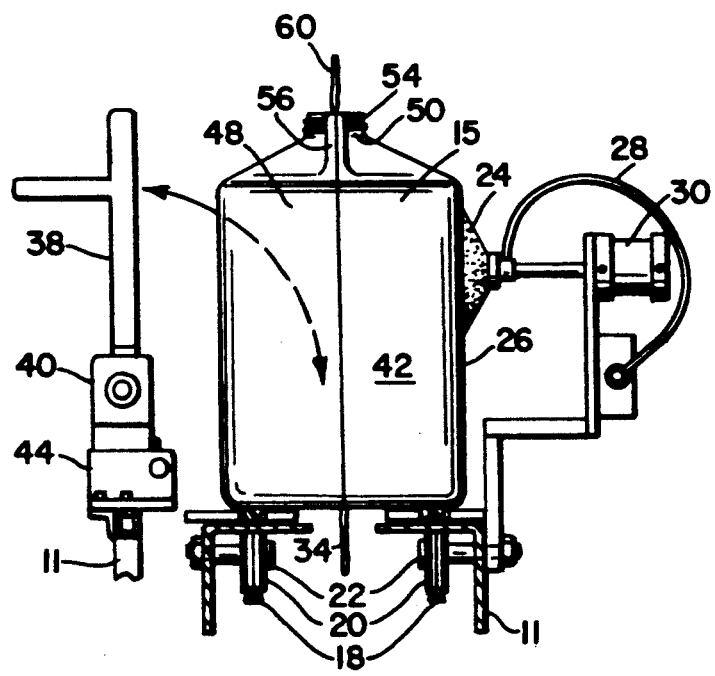
FIG. 3 is a fragmentary end view, partially in section, of the bottle loading station taken along the line 3—3 of FIG. 1.

Pusher bar 38 is preferably a T-shaped structure including a horizontal portion adapted to extend across the path of travel of the bottles and a vertical portion for additional bottle stability, to prevent tipping of the bottles when they are pushed into trimming station 14. When it is in its rotated position, as shown in FIG. 3, pusher bar 38 is positioned laterally outwardly of the path of travel of the bottles, to permit a bottle to freely pass from loading station 12. When in its rotated position, pusher bar 38 can be carried upstream from trimming station 14, past a bottle at the discharge end of infeed conveyor 16, so that pusher bar 38 can subsequently be lowered into the path of bottle movement for pushing a bottle into trimming station 14. As illustrated in FIGS. 1 and 2, pusher bar 38 and associated structure are shown in solid lines in the position for engaging a bottle for pushing movement toward trimming station 14, and are shown in dashed lines at the downstream limit of their travel, at which the bottle that has been pushed is in a desired position on trimming station platform 32.

As best seen in FIG. 2, bottle 15 in position at trimming station 14 includes a body portion 48, a neck portion 50 including a neck opening 52 and neck threads 54 for engaging a screw type closure (not shown), and a handle 56 for convenient carrying of the bottle, the handle being integral with the bottle and defining with bottle body 48 a hand opening that is in the form of a closed loop when viewed from the side as in FIG. 2. Bottle 15 as it enters loading station 12 includes neck opening flash 58, top flash 60, handle opening flash 62, and tail flash 34.

As best seen in FIG. 1, when bottle 15 reaches its intended position at trimming station 14 the longitudinal axis of bottle handle 56 is disposed in a plane that is parallel with the direction of movement of the bottle as designated by arrow A. When bottle 15 is at rest and pusher bar 38 has been retracted, bottle 15 is in position between a pair of opposed parallel side support plates 64 that are in contact with respective opposite sides of bottle 15 to prevent lateral movement of the bottle when it is in trimming station 14.

Figure 4:
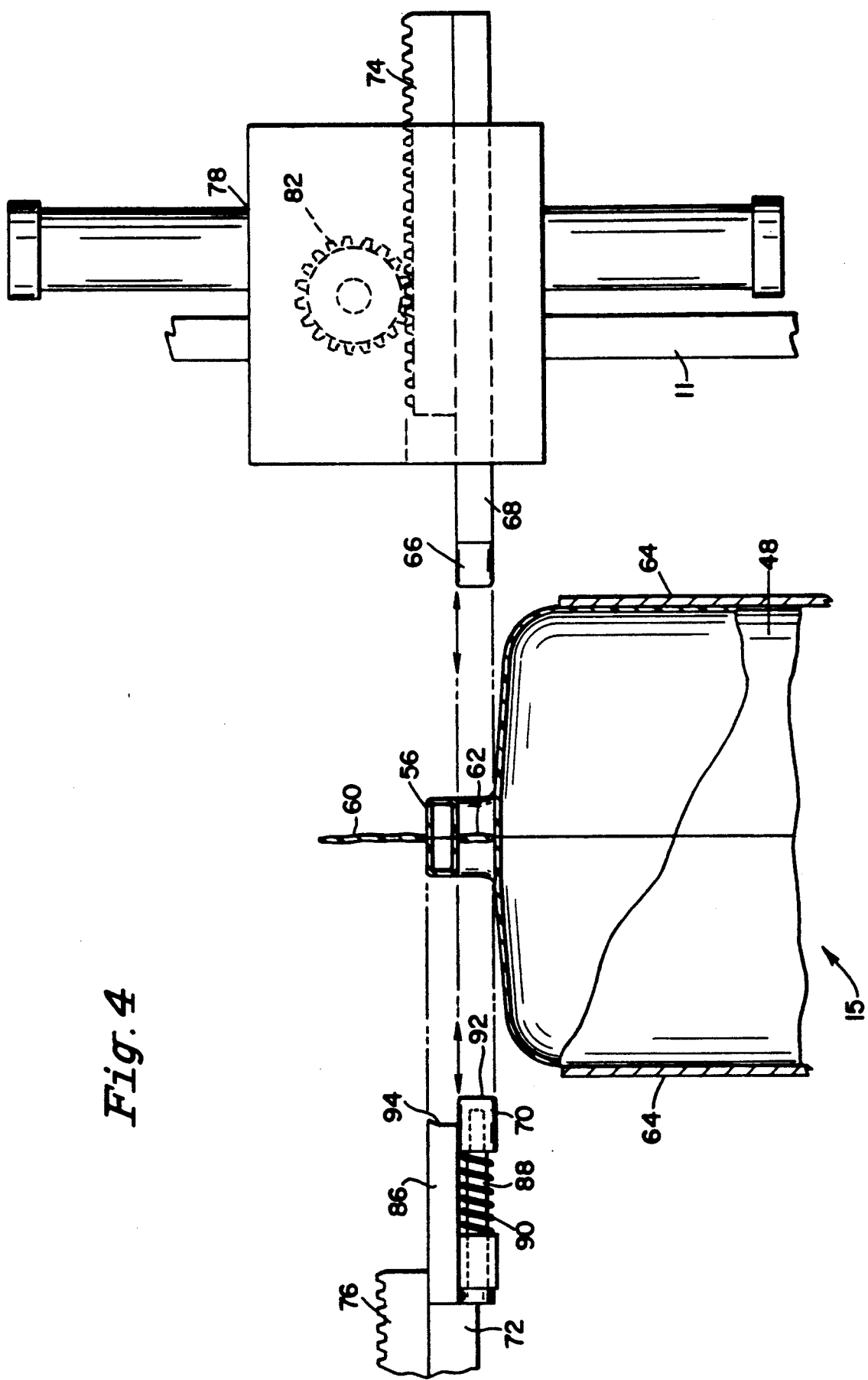
FIG. 4 is an enlarged fragmentary view, partially in section, showing the handle area of a blown plastic bottle along with gripping and punching apparatus for removing the handle opening flash.

Referring now to FIG. 4, the apparatus for separating handle flash 62 from bottle 15 is shown and includes a punch 66, carried by a punch carrier 68, and an anvil 70, carried by an anvil carrier 72. Both punch carrier 68 and anvil carrier 72 are supported by frame 11 and are positioned on opposite sides of bottle 15 for movement toward and away from bottle 15 by respective racks 74, 76, which are linearly actuated by respective rotary actuators 78, 80 (see FIG. 5), which can be pneumatic rotary actuators or electric motors, to drive respective pinions 82, 84 to slide racks 74, 76 toward and away from bottle 15. Punch 66 and anvil 70 preferably have a cross section that corresponds in shape with the handle opening, to cleanly and completely separate handle opening flash 62 from bottle 15.

Figure 5:
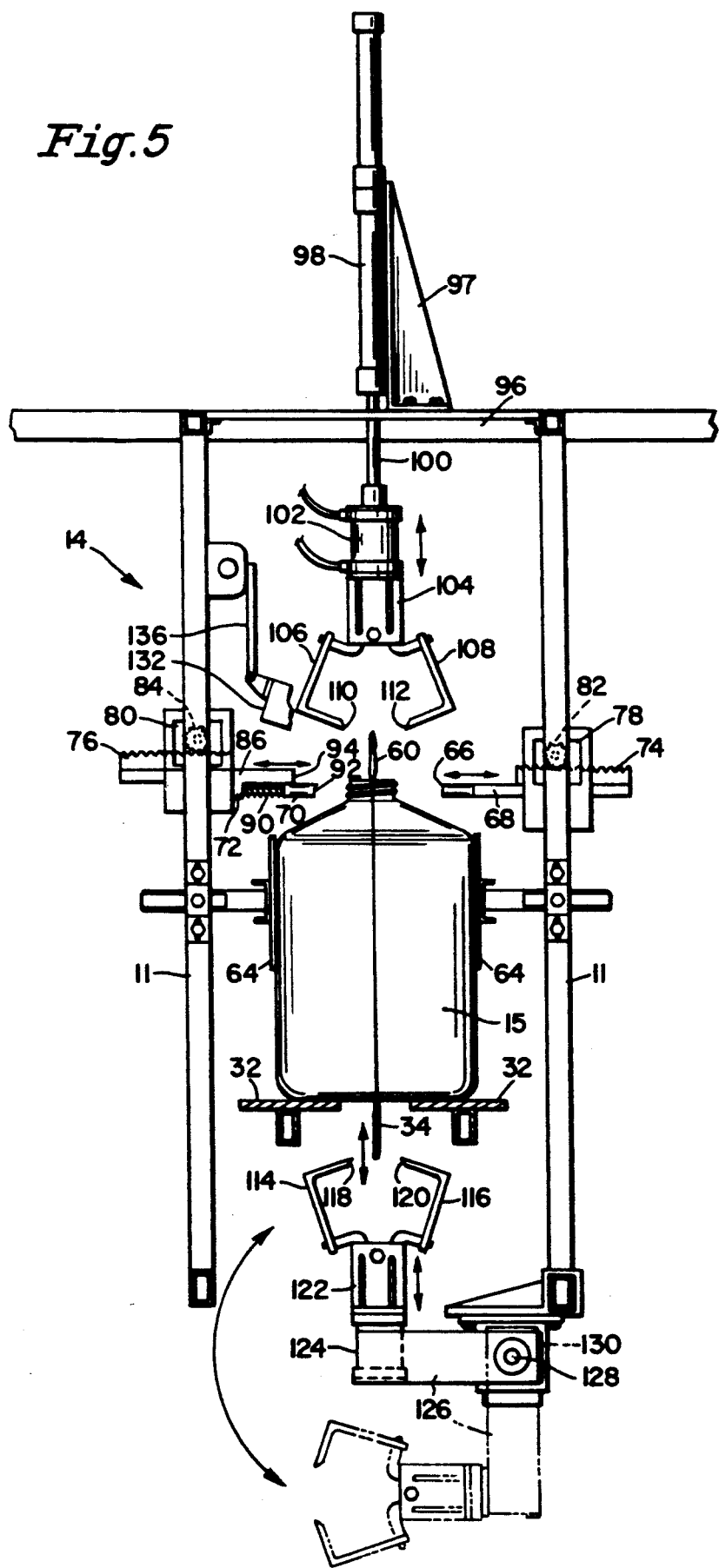
FIG. 5 is an end elevational view, downstream of the trimming station, looking in an upstream direction and showing the gripping apparatus for gripping and removing the bottle neck section flash and the bottle base section flash.

Anvil carrier 72 also carries an elongated backup or stop bar 86 that is positioned immediately above anvil 70 to contact the side of handle 56 opposite to punch 66 and to provide support as punch 66 is moved laterally toward and past the handle axis from one side of trimming station 14. As shown in FIGS. 4 and 5, anvil 70 is slidable relative to anvil carrier 72 along a pair of anvil support rods 88, only one of which is visible in FIGS. 4 and 5, and is spring biased toward punch 66 by a pair of compression coil springs 90, only one of which is visible in FIGS. 4 and 5. As is also apparent in FIGS. 4 and 5, the front face 92 of anvil 70 is initially forward of the front face 94 of backup bar 86.

Neck opening flash 58, top flash 60, and bottom flash 34 are removed by respective gripper jaws that are adapted to grip the flash and are positioned for movement toward and away from bottle 15 as shown in FIG. 5. Frame 11 includes a cross member 96 that is positioned above bottle 15 when the bottle is in the trimming position. An angle 98 is bolted to cross member 96 to provide a substantially vertical mounting surface on which a linear cylinder 98 is secured. Cylinder 98 includes a piston (not shown) connected with a piston rod 100 that carries a gripper operating cylinder 102. Gripper cylinder 102 is preferably a pneumatically-operated cylinder to which a gripper housing 104 is secured, gripper housing 104 having an internal link arrangement to selectively pivot a pair of top flash gripper jaws 106, 108 between open and closed positions. Gripper jaws 106, 108 are generally L-shaped members that include a pair of opposed gripping surfaces 110, 112, respectively, for gripping top flash 60 and neck opening flash 58. The function of top flash gripper jaws 106 and 108 is to grip and remove the top flash and the neck opening flash from bottle 15 when the bottle is restrained at trimming station 14 between side support plates 64 and by the cooperative action between handle opening punch member 66 and backup bar 94.

Positioned below bottle 15 at trimming station 14 is a pair of bottom flash gripper jaws 114, 116 that each include respective gripping surfaces 118, 120, which are movable between closed and open positions in a manner similar to that of the top flash gripper jaws described above. Bottom flash gripper jaws 114, 116 are connected with a gripper housing 122 which is, in turn, moved toward and away from the base of bottle 15 by a gripper cylinder 124 that can be pneumatically operated and that can be similar in structure and operation to gripper cylinder 102 associated with the top flash gripper jaws.

Gripper housing 122 and gripper cylinder 124 are supported on a gripper carrier arm 126 that is pivotable about a pivot axis 128 by a rotary actuator 130, such as a pneumatic actuator, an electric motor, or the like. In that regard, gripper carrier ar 126 is shown in full lines in the position it assumes for permitting gripping of bottom flash 34 by bottom flash gripper jaws 114, 116.

Bottom flash 34, after removal from bottle 15, is carried downwardly away from bottle 15 by bottom flash gripper jaws 114, 116, which then are pivoted about the gripper carrier arm pivot 128 to the position shown in dashed lines in FIG. 5, whereupon the gripper jaws are opened to release the bottom flash, which falls on the scrap conveyor 36 positioned beneath trimming station 14 as shown in FIG. 2.

Top flash 60 and neck flash 58 is also deposited on scrap conveyor 36, and the apparatus employed is best seen in FIG. 1, in which a scrap tray 132 is moved into position below top flash gripper jaws 106, 108 after the jaws have been closed and have been withdrawn upwardly away from bottle 15 to pull top flash 60 and neck flash 58 from bottle 15. Tray 132 is moved into position by means of a pneumatic cylinder 134 that carries a tray holder 136 by which scrap tray 132 is pivotally supported about a pivot axis aligned with the direction of movement of the bottles (arrow A in FIG. 1). As illustrated in FIG. 1, 132 tray is in its downstream, withdrawn position, and when shifted to the left, as viewed in FIGS. 1 and 2, the lower surface of tray 132 contacts an inclined camming surface 138 that causes tray 132 to pivot so that the outermost end of tray 132 is carried upwardly to position tray 132 in substantially a horizontal position when tray 132 is positioned below top flash gripper jaws 106 and 108. When tray 132 is so positioned, gripper jaws 106 and 108 are opened, releasing top flash 60 and neck flash 58 to drop into tray 132, whereupon the tray is carried in a downstream direction by cylinder 134 from a position below top flash gripper jaws 106 and 108 to the downstream position shown in FIGS. 1 and 2. At that position, because of the downward inclination of camming surface 138 in the downstream direction, scrap tray 132 is pivoted downwardly by gravity so that its outer edge is below the pivot axis, as a result of which the top flash slides downwardly along tray 132 and is received in a scrap transfer chute 140 that conveys the flash below the level of trimming station platform 32 and deposits it on scrap conveyor 36.

Handle opening flash 62, which is removed from the handle opening, either falls along the sloping shoulder walls of bottle 15, or if it remains on the bottle in position it can be blown from the top of bottle 15 by means of an air jet that issues from an air tube 142, as shown in FIG. 1.

In operation, blown plastic bottles from one or more blow molding machines are conveyed to loading station 12 by means of infeed conveyor 16. The bottles are provided in a single line and the first bottle 15 in the line is held in position by means of a vacuum cup 24, which is part of a vacuum-operated bottle holder, near the downstream end of infeed conveyor 16.

While the first bottle is being held in position by the vacuum cup 24, pusher bar 38 is in the upright position so that it does not block forward movement of the bottle. The first bottle in line is permitted to be carried by infeed conveyor 16 to the upstream end of trimming station 14 by releasing the vacuum in vacuum cup 24 and retracting the vacuum cup from the bottle a short distance by actuation of pneumatic cylinder 30. Because infeed conveyor 16 is in continuous operation, it carries the first bottle beyond the conveyor downstream guide pulleys 20. At substantially the same time the second bottle in line is carried by infeed conveyor 16 to the position previously occupied by the first bottle, whereupon pneumatic cylinder 30 is actuated to move vacuum cup 24 against the side of the second bottle, and the cup is placed into communication with the source of vacuum to securely hold the second bottle and those upstream from it stationary and prevent their entry into trimming station 14 until they are sequentially released.

After the first bottle has been carried to the upstream end of trimming station platform 32, and while the second bottle is being grippe by vacuum cup 24, pusher bar 38 is pivoted into the path of the bottles by means of rotary pneumatic actuator 40 so that the bar extends across infeed conveyor 16. Cylinder 44 is then actuated to carry rotary actuator 40 and pusher bar 38 in a downstream direction, whereupon pusher bar 38 contacts the rear surface of the first bottle to push it along trimming station platform 32 to the trimming position, shown in full lines in FIG. 1, whereupon pusher bar 38 is again pivoted upwardly by rotary actuator 40 and retracted so that it does not obstruct the movement of the next succeeding bottle in the line as pusher bar 38 moves from its dashed line position shown in FIG. 1 to its position as shown in full lines in that Figure.

With the first bottle in position at trimming station 14, anvil 70, backup bar 86, and punch 66 of the handle opening flash removal apparatus are simultaneously actuated by their respective rotary actuators 78, 80 to drive the racks 74, 76 and the associated anvil, backup, and punch members toward the bottle.

As backup bar 86 contacts the side of bottle handle 56, the relative positioning between face 94 of backup bar 86 and anvil surface 92 of anvil 70 results in anvil surface 92 positioned within the handle opening and adjacent one side of handle opening flash 62. At the same time anvil 70 is moving toward the bottle, punch 66 is also moving toward the bottle from the opposite side, and in alignment with anvil surface 92 to contact the opposite side of handle opening flash 62. Punch 66 continues its movement to push both flash 62 and anvil 70 in the leftward direction, as viewed in FIGS. 4 and 5. As punch 66 contacts flash 62 and passes through the handle opening to eject the handle flash, backup bar 86 is in contact with the opposite side of bottle handle 56 to prevent lateral movement of the bottle during the handle opening flash removal operation.

When the operating stroke of punch 66 is completed, anvil 70, backup bar 86, and punch 66 are held in their inward, extended position by the respective racks and rotary actuators, to restrain the bottle from vertical movement while it is at trimming station 14, to permit top flash 60, neck flash 58, and bottom flash 34 to be pulled from the bottle.

The removal of the top, neck, and bottom flash is preferably performed simultaneously, in order to reduce overall cycle time, but, if desired, those steps can be performed sequentially. As the bottle is held in the trimming position against lateral movement by side support plates 64, it is held against downward vertical movement by trimming station platform 32, and it is held against upward vertical movement and conveying direction movement by the handle opening flash removal apparatus.

Top flash gripper jaws 106, 108 are moved from an upward position downwardly toward the bottle by means of linear slide 98, the gripper jaws initially being in the open position. Simultaneously, bottom flash gripper jaws 114, 116, which are also initially in the open position, are pivoted by rotary actuator 130 from the position shown in dashed lines in FIG. 5, about pivot axis 128, to the operating position shown in full lines in FIG. 5. When in the operating position, top flash gripper jaws 106, 108 are each on opposite sides of bottle top flash 60, and bottom flash gripper jaws 114, 116 are in opposite positions on each on opposite sides of bottle bottom flash 34. The respective gripper cylinders 102, 122 are then actuated to cause their gripper jaws to close and to grip the respective flash portions, after which top flash gripper housing 104 is retracted upwardly and bottom flash gripper housing 122 is retracted downwardly and is also thereafter rotated counterclockwise, as viewed in FIG. 5, to move bottom flash gripper jaws 114, 116 away from the bottle, to simultaneously pull the top and bottom flash portions from the bottle. Immediately thereafter, the handle opening flash removal apparatus is retracted to withdraw punch 66 and anvil 70 from the bottle handle opening, and the bottle is pushed in a downstream direction by the next succeeding bottle as the latter is brought to trimming station 14. A suitable outflow conveyor (not shown) can be provided to receive the trimmed bottle and to convey it to a bottle filling line, or to be packaged for shipment to a separate filling facility, or the like.

As the trimmed bottle is released from the trimming position, bottom flash gripper jaws 114, 116 are opened by gripper cylinder 124, thereby releasing bottom flash 34 to fall onto scrap conveyor 36, which is positioned immediately downstream of and below trimming station 14.

Similarly, as top flash gripper jaws 106, 108 are carried upwardly away from the bottle, scrap tray 132 is carried by pneumatic cylinder 134 to a position immediately below top flash gripper jaws 106, 108. As scrap tray 132 moves toward the trimming position its lower surface contacts inclined camming surface 138 and rides along that surface to cause scrap tray 132 to assume a substantially horizontal position when it is below top flash gripper jaws 106, 108. When scrap tray 132 is in that position top flash gripper jaws 106, 108 are opened, thereby releasing top flash 60 and associated neck flash 58 to fall into scrap tray 132, which is then conveyed away from the trimming position, in the same direction as the direction of bottle flow, whereupon the sloping edge of the camming surface 138 permits the outermost edge of the scrap tray to pivot downwardly, by gravity, about the scrap tray pivot axis, so that the top flash and neck flash slides from the scrap tray into flash discharge chute 140 that directs the flash to scrap conveyor 36. The collected flash can either be recycled as a part of the material from which the bottles are blown, or, alternatively, it can be conveyed to a regrinder (not shown) to provide smaller sized particles for use in other plastics molding processes.

As the first bottle is discharged from trimming station 14 by being pushed downstream by the next succeeding bottle as it is pushed into trimming station 34 by pusher bar 38, the vacuum-operated bottle holder engages the next bottle in line to hold it in position at loading station 12. Thereupon, the entire operating sequence is repeated for the succeeding bottles.

The handle opening flash can fall by gravity along the shoulders of the bottle down to scrap conveyor 36. If it does not fall by itself an added removal force can be provided by an air jet directed laterally (see FIG. 1) from air tube 142 for blowing the handle opening scrap off the top of the bottle so that it falls onto the scrap conveyor below.

It can be seen that the present invention provides a substantially improved method and apparatus for the removal of bottle flash in that it completely removes the flash from all of the flash-carrying portions of the bottle, and disposes of the flash in a controlled fashion. In that regard, the present invention operates to positively pull the top flash off the bottle, and thus avoid the deficiencies of a punch and die arrangement, which has been found not to be completely reliable in that when the flash is fairly hot and thus pliable, the punch and die arrangement often simply folds the flash over and does not completely remove it. Additionally, by pulling the top flash from the bottle by a substantially axial pulling force, the bottle neck and thread finish is not distorted, as could occur by use of the punch and die arrangement of the prior art. In that connection, the shearing action of the punch and die arrangement can severely distort the bottle neck and threads if the flash is tenacious and is difficult to completely sever. Further, because the neck of the bottle is typically the hottest part of the bottle, because of the greater thickness of material at that portion of the bottle, any difficulty in shearing the flash off will tend to distort the neck and threads to an oval shape as the punch strikes the flash.

The present invention is also advantageous in that precise bottle alignment relative to a punch and die need not be rigidly maintained. Misalignment of a bottle in a punch and die arrangement could result in a ruined bottle if the punch and die contact the bottle body instead of the flash. However, with the present invention such critical alignment is not necessary because the precise position of the gripping jaws on the flash is not critical.

Finally, another distinct advantage of the present invention over the prior art devices is that it can very readily accommodate different sizes and styles of bottles. Because a punch and die are not required for top flash and bottom flash removal, separate specific punch and die configurations are not needed.

It will be apparent that the present invention provides distinct advantages over the prior art method and apparatus in that it provides positive, rapid, and effective flash removal from a blown plastic bottle, particularly relatively large bottles, such as five-gallon plastic bottles.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Trimming apparatus for trimming flash from a blown plastic bottle, said apparatus comprising:
   a. a frame;
   b. a conveyor supported by the frame for conveying, from a blowing station to a trimming station, blow molded plastic bottles including a handle, a top with a bottle neck opening, and a bottom, the bottles having molding flash to be removed from a hand-receiving opening defined by the handle, from the bottle top, and from the bottle bottom; generally horizontal support means at said trimming station for engaging the bottle and supporting the bottle in the upright position with the bottle neck opening facing upwardly;
   c. a punch supported by the frame for punching plastic flash from the hand-receiving opening, the punch including a stop bar for engagement with one side of the bottle handle to restrain the bottle from lateral movement during a punching operation to remove the hand-receiving-opening flash;
   d. bottom flash removal apparatus supported by the frame for removing the bottom flash from the bottle, the bottom flash removing apparatus including a bottom flash gripper movable in a vertical direction toward and away from the bottle for gripping and pulling the bottom flash from the bottle while the bottle is held in its upright position at the trimming station;
   e. top flash removal apparatus supported by the frame for removing top flash from the bottle, the top flash removal apparatus including a top flash gripper movable in a vertical direction toward and away from the bottle for gripping and pulling top flash from the bottle while the bottle is held in its upright position at the trimming station;
   f. a flash removal conveyor positioned below the trimming apparatus for carrying away bottle flash is received by the flash removal conveyor; and
   g. a top flash collector pan movable between a retracted position in which the top flash collector allows plastic to drop onto the flash removal conveyor and an extended position at which the top flash collector pan is positioned to allow top flash to be received.

2. Trimming apparatus in accordance with claim 1, wherein the conveyor includes a conveyor belt, and a pusher bar carried by the frame, the pusher bar engageable with a downstream side of a bottle for pushing the bottle from the conveyor belt to the trimming station.

3. Trimming apparatus in accordance with claim 2, wherein the pusher bar is pivotally carried for pivotal movement about an axis substantially parallel with the direction of bottle movement, and a pusher bar actuator for carrying the pusher bar linearly in a direction substantially parallel with the bottle conveying direction.

4. Trimming apparatus in accordance with claim 1, wherein said support means includes a base for engaging the bottom of the bottle to be trimmed, the base including a slot to permit bottom flash to extend through the slot to permit bottle movement along the base and to permit the flash to extend through the slot for subsequent removal.

5. Trimming apparatus in accordance with claim 4, said bottom flash removing apparatus including a pair of gripper jaws to selectively grip and release the bottle bottom flash, and an actuator to move the gripper jaws in a vertical direction toward and away from the bottle so that the bottom flash is removed when the bottom flash gripper jaws grip the flash and the gripper jaws are moved in a direction away from the bottle to pull the bottom flash from the bottle.

6. Trimming apparatus in accordance with claim 4, said top flash removal apparatus including a pair of top flash gripper jaws actuatable into gripping engagement with the top flash and to release the top flash, and a gripper jaw actuator for selectively opening and closing the gripper jaws, and a top flash gripper actuator for moving the top flash gripper jaws in a vertical direction toward and away from the bottle, so that when the gripper jaws clampingly engage the bottom top flash, movement of the gripper jaws by the flash gripper actuator causes the top flash to be pulled from the bottle.

7. Trimming apparatus in accordance with claim 4, including handle opening flash removal apparatus having a punch member and an anvil disposed on opposite sides of a bottle handle for collinear movement toward and away from each other, the anvil supported by a backing member with contacts a portion of the bottle handle to hold the handle in position as the handle opening flash is removed by the punch and anvil.

8. Trimming apparatus in accordance with claim 7, wherein each of the punch member and the anvil member is carried by a separate rack, the respective racks being movable linearly toward and away from each other by respective rotary actuators.

9. Trimming apparatus in accordance with claim 4, including
 a bottom flash remover having a pair of gripper jaws to selectively grip and release the bottle bottom flash, and an actuator to move the gripper jaws toward and away from the bottle so that the bottom flash is removed when the bottom flash gripper jaws grip the flash and the gripper jaws are moved in a direction away from the bottle to pull the bottom flash from the bottle;
 a pair of top flash gripper jaws actuatable into gripping engagement with the top flash and to release the top flash, and a gripper jaw actuator for selectively opening and closing the gripper jaws, and a top flash gripper actuator for moving the top flash gripper jaws toward and away from the bottle, so that when the gripper jaws clampingly engage the bottle top flash, movement of the gripper jaws by the actuator causes the top flash to be pulled from the bottle;
 handle opening flash removal apparatus having a punch member and an anvil disposed on opposite sides of a bottle handle for collinear movement toward and away from each other, the anvil supported by a backing member which contacts a portion of the bottle handle to hold the handle in position as the handle opening flash is removed by the punch and anvil, wherein each of the punch member and the anvil member is carried by a separate rack, the respective racks being movable linearly toward and away from each other by respective rotary actuators.

10. Trimming apparatus in accordance with claim 1, including a cam engageable with an end of the collector pan for pivoting the collector pan about a substantially horizontal axis as the pan is carried in the direction of bottle movement.

11. Trimming apparatus in accordance with claim 1, including a bottle holder positioned upstream of the bottle trimming station for holding a succeeding bottle stationary while a subsequent bottle is undergoing trimming.

12. Trimming apparatus in accordance with claim 11, wherein the bottle holder includes a vacuum-operated holder for engaging the side of a bottle.

13. Trimming apparatus in accordance with claim 1, including a pusher bar for pushing a bottle from the bottle conveyor to the trimming station.

14. Trimming apparatus in accordance with claim 13, wherein the pusher bar is pivotable about a substantially horizontal axis from an operating position to a rest position.

15. Trimming apparatus in accordance with claim 14, including an actuator operably connected with the pusher bar to carry the pusher bar in the direction of bottle movement from the conveyor to the trimming station.

16. Trimming apparatus for trimming flash from a blown plastic bottle, said apparatus comprising:
 a. a frame
 b. a conveyor supported by the frame for conveying, from a blowing station to a trimming station, blow molded plastic bottles including a handle, a top, and a bottom, the bottles having molding flash to be removed from a hand-receiving opening defined by the handle, from the bottle top, and from the bottle bottom; said conveyor including a conveyor belt, a pusher bar carried by the frame, the pusher bar engagable with a downstream side of a bottle for pushing the bottle from the conveyor belt to the trimming station, said pusher bar being pivotally carried for pivotal movement about an axis substantially parallel with the direction of bottle movement, and a pusher bar actuator for carrying the pusher bar linearly in a direction substantially parallel with the bottle conveying direction;
 c. a punch supported by the frame for punching plastic flash from the hand-receiving opening, the punch including a stop bar for engagement with one side of the bottle handle to restrain the bottle from lateral movement during a punching operation to remove the hand-receiving-opening flash;
 d. bottom flash removal apparatus supported by the frame for removing the bottom flash from the bottle, the bottom flash removing apparatus including a bottom flash gripper movable toward and away from the bottle for gripping and pulling the bottom flash from the bottle while the bottle is held in position at the trimming station; and
 e. top flash removal apparatus supported by the frame for removing top flash from the bottle, the top flash removal apparatus including a top flash gripper movable toward and away from the bottle for gripping and pulling top flash from the bottle while the bottle is held in position at the trimming station.

17. Trimming apparatus for trimming flash from a blow plastic bottle, said apparatus comprising:
 a. a frame;
 b. a conveyor supported by the frame for conveying, from a blowing station to a trimming station, blow molded plastic bottles including a handle, a top, and a bottom, the bottles having molding flash to be removed from a hand-receiving opening defined by the handle, from the bottle top, and from the bottle bottom;

c. a punch supported by the frame for punching plastic flash from the hand-receiving opening, the punch including a stop bar for engagement with one side of the bottle handle to restrain the bottle from lateral movement during a punching operation to remove the hand-receiving-opening flash;

d. bottom flash removal apparatus supported by the frame for removing the bottom flash from the bottle, the bottom flash removing apparatus including a bottom flash gripper movable toward and away from the bottle for gripping and pulling the bottom flash from the bottle while the bottle is held in position at the trimming station; and e. top flash removal apparatus supported by the frame for removing top flash from the bottle, the top flash removal apparatus including a top flash gripper movable toward and away from the bottle for gripping and pulling top flash from the bottle while the bottle is held in position at the trimming station;

f. a flash removal conveyor positioned between the trimming apparatus for carrying away bottle flash that is received by the flash removal conveyor, and a top flash collector pan movable between a retracted position in which the top flash collector pan allows plastic to drop onto the flash removal conveyor and an extended position at which the top flash collector pan is positioned to allow top flash to be received.

18. Trimming apparatus in accordance with claim 17, including a cam engagable with an end of the collector pan for pivoting the collector pan about a substantially horizontal axis as the pan is carried in the direction of bottle movement.

19. Trimming apparatus for trimming flash from a blown plastic bottle, said apparatus comprising:

a. a frame;

b. a conveyor supported by the frame for conveying, from a blowing station to a trimming station, blow molded plastic bottles including a handle, a top, and a bottom, the bottles having molding flash to be removed from a hand-receiving opening defined by the handle, from the bottle top, and from the bottle bottom; a pusher bar for pushing a bottle from the bottle conveyor to the trimming station, the pusher bar being pivotable about a substantially horizontal axis from an operating position to a rest position;

c. a punch supported by the frame for punching plastic flash from the hand-receiving opening, the punch including a stop bar for engagement with one side of the bottle handle to restrain the bottle from lateral movement during a punching operation to remove the hand-receiving-opening flash;

d. bottom flash removal apparatus supported by the frame for removing the bottom flash from the bottle, the bottom flash removing apparatus including a bottom flash gripper movable toward and away from the bottle for gripping and pulling the bottom flash from the bottle while the bottle is held in position at the trimming station; and e. top flash removal apparatus supported by the frame for removing top flash from the bottle, the top flash removal apparatus including a top flash gripper movable toward and away from the bottle for gripping and pulling top flash from the bottle while the bottle is held in position at the trimming station.

20. Trimming apparatus in accordance with claim 19, including an actuator operably connected with the pusher bar to carry the pusher bar in the direction of bottle movement from the conveyor to the trimming station.

* * * * *

UNITED STATES PATENT AND TRADEMARK OFFICE
CERTIFICATE OF CORRECTION

PATENT NO. : 5,202,135
DATED : April 13, 1993
INVENTOR(S) : John E. Yawn

It is certified that error appears in the above-identified patent and that said Letters Patent is hereby corrected as shown below:

On the title page, in item [73] Assignee, change "Tex." to

--Tenn.--

Signed and Sealed this

Thirtieth Day of November, 1993

Attest:

BRUCE LEHMAN

*Attesting Officer*  *Commissioner of Patents and Trademarks*